May 9, 1961 — E. C. HANDWERK — 2,983,493
FRACTIONATING COLUMN WITH STEPPED TRAYS
Filed March 3, 1958

*INVENTOR.*
ERWIN C. HANDWERK
BY
ATTORNEY

United States Patent Office 2,983,493
Patented May 9, 1961

2,983,493
FRACTIONATING COLUMN WITH STEPPED TRAYS

Erwin C. Handwerk, Lehighton, Pa., assignor to American Metal Climax, Inc., New York, N.Y., a corporation of New York Filed Mar. 3, 1958, Ser. No. 718,596

4 Claims. (Cl. 261—109)

This invention relates to the purification of metallic vapors and more particularly to apparatus adapted for the fractional distillation of zinc to effect its separation from contaminants such as iron, lead and cadmium. This application is a continuation in part of my copending application Serial No. 638,849, filed February 7, 1957.

The aforesaid copending application discloses an improved fractionating column formed of refractory materials in which a plurality of trays are at various levels supported by their edge portions fitted loosely in vertically spaced horizontal grooves in the inner sides of the walls of the column. While this column offers several advantages over prior columns, such as greater simplicity, lower cost and more durability, it has now been found possible to increase the intimate contact between ascending hot vapors and descending liquid condensed therefrom. Improved contact between vapors and liquid is highly desirable because it leads directly to more efficient fractionation which, in turn, permits the column or tower height to be diminished. With fractionating towers made of refractory materials, any measurable reduction in the height of the structure is clearly reflected in both the original cost and the cost of maintenance. It is not difficult to understand that as a column built of refractory material and exposed to elevated temperatures is made taller the greater is the tendency of that column to develop cracks and leaks.

In accordance with this invention, the trays of a fractionating column for metallic vapors have an upper face subdivided to hold a stepped-down series of shallow pools of liquid condensed from the vapors so that this liquid may cascade successively from the highest pool to the lowest pool on each tray while hot vapors flow upwardly over the steps of each tray in intimate contact with the cascading liquid. Preferably, each tray comprises a plurality of tray elements arranged in a stepped series with one side portion of one tray element overlapped and abutted with a side portion of another tray element, and each tray element has a weir along such side portion so that liquid may flow thereover to the overlapped and abutted tray element and, in the case of the lowest tray element of each stepped series, the liquid may spill over the weir of such lowest tray element onto the highest tray element of the next lower stepped series of tray elements. It is well to note that steps of the order of 0.5 to 1 inch are satisfactory and that the liquid cascading over these seemingly small steps is sufficiently turbulent to enhance the fractionating efficiency. Since an important advantage of the present invention is the curtailment of tower height, it is advisable to limit the total rise in each stepped series of tray elements to not more than about 6 inches, measured from the surface of the lowest pool to the surface of the highest pool in that stepped series.

For a fuller understanding of the invention, reference is now made to the accompanying drawings wherein.

Figure 1:
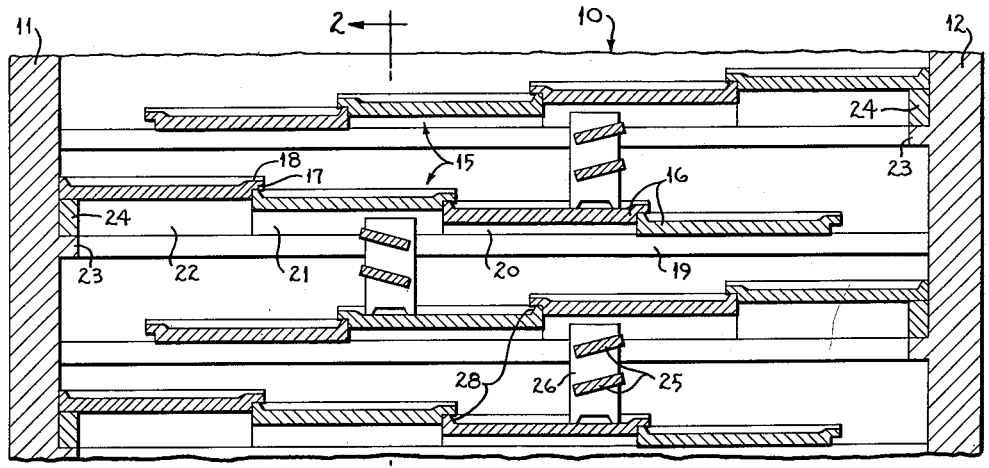
Figure 1 is a vertical section of a portion of a fractionating column formed of refractory materials wherein hot vapors contact liquid condensed from the vapors and cascading over a plurality of steps present in each tray of the column.
Figure 2:
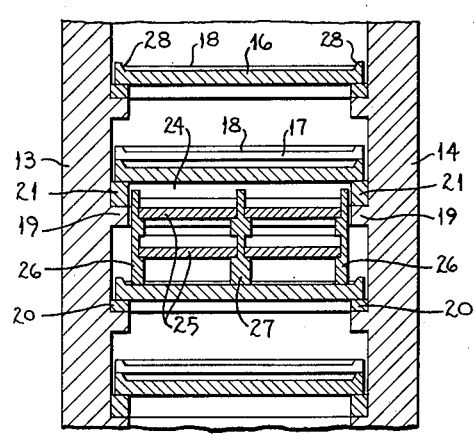
Figure 2 is a vertical section of the same portion of the fractionating column taken through line 2—2 of Figure 1.

The fractionating column of Figures 1 and 2 comprises a tower 10 formed by two pairs of substantially parallel walls 11, 12 and 13, 14 arranged to provide a tower opening having a rectangular horizontal cross-section. A plurality of vertically spaced trays 15 are supported at their end portions by walls 13, 14.

Each tray 15 is formed of four tray elements 16 arranged with the side portion of one tray element 16 overlapped and abutted with the side portion of another tray element so as to provide a series of steps over which liquid may cascade as it flows over tray 15 formed by tray elements 16. As shown, each tray element 16 is provided with a projecting lip 17 and a weir 18 along one side portion so as to facilitate the flow of liquid from one tray element 16 to the next. Projecting lip 17 also ensures a better seal at the overlapped and abutted side portions of contiguous tray elements 16 so that the tendency of ascending hot vapors and of the cascading liquid to leak through contiguous tray elements 16 is minimized.

The inner sides of walls 13, 14 have horizontal grooves or, to state it another way, are provided with horizontal protruding ledges 19. The end portions of each tray element 16 rest on ledges 19 to provide the sole support of tray element 16. The lowermost tray element 16 of each stepped tray 15 rests directly on ledges 19 while the next higher tray element 16 rests on spacers 20 disposed between that tray element 16 and ledges 19 and similar spacers 21, 22 are placed between successively higher tray elements 16 and ledges 19. The uppermost tray element 16 of each stepped tray 15 is also supported along its side portion abutting wall 11 or 12 by a ledge 23 and spacer 24.

To improve further the contact between ascending hot vapors and liquid cascading over the stepped trays 15, deflectors 25 are disposed over the lower end of each stepped tray 15. Deflectors 25 are simply supported by slotted uprights 26 placed on a tray element 16 and resting against ledges 19 of walls 13, 14. Preferably, each deflector 25 is made in two pieces and a center slotted upright 27 is supported in the center of tray element 16.

Each tray element 16 has a raised edge 28 along its two end portions and its two side portions so as to hold a shallow pool of condensed liquid. Raised edge 28 along the side portion of each tray element 16 which has projecting lip 17 is partly cut away to provide weir 18.

The fractionating column of this invention is predicated on the use of refractory materials necessitated by the high temperature at which the column will be operated and/or by the corrosive, erosive or like action of the vapors and liquid flowing through the column. Suitable refractory materials for exposure to zinc vapors and molten metal include graphite, high grade firebrick and silicon carbide. With the best refractory materials now available, it is advisable to make the maximum dimension of tray elements 16 not more than about 3 feet and the dimension at right angles thereto not more than about 2 feet. Generally, the thickness of tray elements 16 is approximately 2 inches. Raised edges 28 about 1 inch wide and 1 inch high confine the liquid on each tray element 16 in a pool which is desirably maintained only about 0.5 inch deep by weir 18. Ledges 19 having a width not exceeding 2 inches provide adequate support for stepped trays 15.

In a specific illustrative embodiment of the invention shown in Figures 1 and 2, a fractionating column for eliminating cadmium from zinc has walls 6¾ inches wide made of high grade firebrick. Each tray element 16 measures 2 feet 8 inches in length and 2 feet in width. Four tray elements 16 are arranged to form each stepped tray 15 in the column. Fourteen stepped trays 15 are equally spaced so that the distance between the lowermost tray 15 and the uppermost tray 15 is only 15 feet. The overall width of the column between walls 11, 12 is 9 feet. This fractionating column is designed to yield zinc of 99.99% by weight purity at a daily rate of 50 tons while eliminating cadmium from the crude zinc undergoing fractionation.

Figure 3:
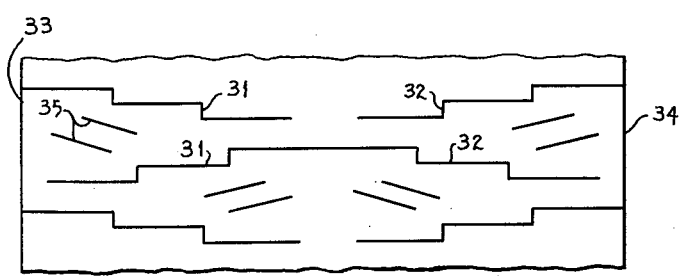
Figure 3 is a diagrammatic elevation of a portion of a fractionating column wherein the tray at each level in the column provides two series of steps over which the condensed liquid cascades.

Figure 3 is a diagrammatic representation of a portion of a fractionating column in which the tray at each level is formed of two series of steps. At one level, the two series of steps 31, 32 are separated so that liquid flows from the walls 33, 34 of the column toward the center thereof and, at the next lower level, the two series of steps 31, 32 are contiguous to one another so that the liquid flows partly down series 31 and partly down series 32. In short, the use of trays with two series of steps yields a column of limited height and high capacity. Baffles 35 are positioned between the stepped trays to enhance the impinging contact of hot vapors with the cascading liquid on the stepped trays.

Figure 4:
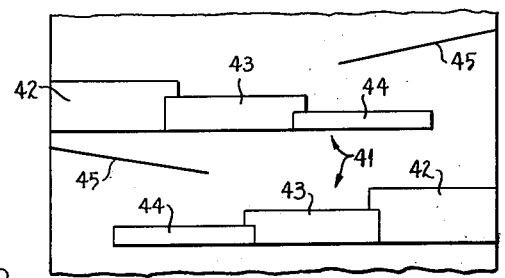
Figure 4 is a diagrammatic elevation of a portion of a fractionating column showing a modification of the trays in Figure 1.

Figure 4 diagrammatically shows a modification of the stepped trays of this invention wherein each stepped tray 41 is made of three tray elements 42, 43, 44 of diminishing thickness. In this embodiment, the bottom of each stepped tray 41 is flat so that there is less volumetric hold-up of hot vapors under stepped trays 41 than there is under stepped trays 15 of Figure 1. A single large baffle 45 is disposed over each tray element 44 to maintain a high vapor velocity over tray element 44.

Figure 5:
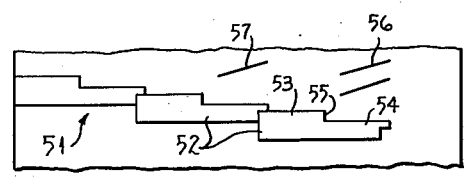
Figure 5 is a diagrammatic elevation of a portion of a fractionating column showing still another modification of the trays in Figure 1.

Figure 5 shows a stepped tray 51 made of three tray elements 52 arranged with their side portions in overlapping and abutting relationship as in the case of tray elements 16 in Figure 1. Tray elements 52, however, are each provided with a thick portion 53 and a thin portion 54 so that the liquid flowing across tray element 52 cascades over an intermediate step 55. In other words, tray elements 52 may be used to increase the number of steps in each tray of a fractionating column to achieve intimate contact between the ascending hot vapors and the condensed liquid descending through the fractionating tower. Figure 5 also illustrates another arrangement of baffles to deflect the vapors against the liquid on the trays. A pair of baffles 56 are disposed over the lowest tray element 52 of each stepped tray 51 and a single baffle 57 is over the next higher tray element 52.

Various modifications of the invention may be made, upon consideration of the foregoing disclosure, without departing from its spirit or scope. For instance, heating means, particularly radiation refractory tubes, may be disposed between the stepped trays of this invention in the lower portion of the fractionating column as disclosed in my copending application Serial No. 686,317, filed September 26, 1957, so that the temperature along the height of the column may be adjusted as desired. Conversely, refractory tubes through which a cooling gas may be passed may be disposed between the stepped trays in the upper portion of a fractionating tower to increase condensation of the ascending hot vapors and thus ensure adequate flow of liquid over the stepped trays. Accordingly, only such limitations should be imposed on the invention as are set forth in the appended claims.

What is claimed is:

1. In a fractionating column for metallic vapors, wherein ascending hot metallic vapors are contacted with descending liquid metal condensed from said vapors, which is formed of refractory materials and which comprises four substantially vertical walls arranged to provide a column with an opening of substantially rectangular horizontal cross-section and a plurality of vertically spaced trays supported solely by said walls of said column, the improvement comprising supporting means including horizontal grooves in the inner sides of said walls, each of said spaced trays comprising a plurality of tray elements of substantially rectangular form, each of said tray elements having one side portion overlapped and abutted with the side portion of another tray element and having a weir along a side portion to hold a shallow pool of liquid metal on said tray element, and each of said spaced trays having edge portions disposed loosely and movably in contact with said supporting means and cooperating therewith to support said tray elements of each tray in stepped relationship across said column, whereby the liquid metal cascades across the stepped tray elements of each tray and drops to the highest step of the next lower tray.

2. The fractionating column of claim 1 wherein vapor deflectors are supported on a tray element in the vicinity of the lowest step of each spaced tray, said deflectors being arranged to direct hot metallic vapors against liquid metal flowing over a tray element from which said liquid metal cascades on to the tray element on which said deflectors are supported.

3. In the refining of zinc by fractional distillation in a fractionating column provided with a plurality of vertically spaced trays for contacting hot zinc vapors with liquid zinc condensed therefrom, the improvement of maintaining turbulence in the liquid zinc flowing over said trays, which comprises cascading the liquid zinc over a series of descending steps in each of said trays, and repeatedly spilling said liquid zinc from the lowest step of one series onto the highest step of the next lower series.

4. The defining of zinc as defined in claim 3 wherein the hot zinc vapors flowing over the lower end of the series of descending steps in each tray are deflected against the upper end of said series of descending steps.

References Cited in the file of this patent

UNITED STATES PATENTS

| | | |
|---|---|---|
| 719,749 | Cochrane | Feb. 3, 1903 |
| 846,499 | Murray | Mar. 12, 1907 |
| 1,097,135 | Mellen | May 19, 1914 |
| 1,994,349 | Ginder et al. | Mar. 12, 1935 |
| 2,174,559 | Anderson et al. | Oct. 3, 1939 |
| 2,515,090 | Linder | July 11, 1950 |